United States Patent
Jia (10) Patent No.: US 8,804,819 B1
(45) Date of Patent: Aug. 12, 2014

(54) METHOD AND APPARATUS FOR ENCODING VIDEO USING DATA FREQUENCY

(75) Inventor: Wei Jia, San Jose, CA (US)

(73) Assignee: Google Inc., Mountain View, CA (US)

(*) Notice: Subject to any disclaimer, the term of this patent is extended or adjusted under 35 U.S.C. 154(b) by 226 days.

(21) Appl. No.: 13/089,383

(22) Filed: Apr. 19, 2011

(51) Int. Cl.
  *H04N 7/12* (2006.01)
  *H04N 7/50* (2006.01)

(52) U.S. Cl.
  CPC ........................................ *H04N 7/50* (2013.01)
  USPC .................................................... 375/240.02

(58) Field of Classification Search
  CPC ........................................................ H04N 7/50
  See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |
| 5,337,086 A | 8/1994 | Fujinami | |
| 5,398,068 A | 3/1995 | Liu et al. | |
| 5,512,952 A | 4/1996 | Iwamura | |
| 5,731,840 A | 3/1998 | Kikuchi et al. | |
| 5,886,742 A | 3/1999 | Hibi et al. | |
| 5,916,449 A | 6/1999 | Ellwart et al. | |
| 5,930,387 A | 7/1999 | Chan et al. | |
| 5,991,447 A | 11/1999 | Eifrig et al. | |
| 6,005,625 A | 12/1999 | Yokoyama | |
| 6,005,980 A | 12/1999 | Eifrig et al. | |
| 6,021,213 A | 2/2000 | Helterbrand et al. | |
| 6,044,166 A | 3/2000 | Bassman et al. | |
| 6,058,211 A | 5/2000 | Bormans et al. | |
| 6,195,391 B1 * | 2/2001 | Hancock et al. | 375/240.24 |
| 6,272,179 B1 | 8/2001 | Kadono | |
| 6,289,049 B1 | 9/2001 | Kim et al. | |
| 6,359,929 B1 | 3/2002 | Boon | |
| 6,363,119 B1 | 3/2002 | Oami | |
| 6,381,277 B1 | 4/2002 | Chun et al. | |
| 6,462,791 B1 | 10/2002 | Zhu | |
| 6,735,249 B1 | 5/2004 | Karczewicz et al. | |
| 7,114,129 B2 | 9/2006 | Awada et al. | |
| 7,197,070 B1 | 3/2007 | Zhang et al. | |
| 7,424,056 B2 | 9/2008 | Lin et al. | |
| 8,060,651 B2 | 11/2011 | Deshpande et al. | |

(Continued)

FOREIGN PATENT DOCUMENTS

EP  0634873  9/1998

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

(Continued)

*Primary Examiner* — Sath V Perungavoor
*Assistant Examiner* — Kate Luo
(74) *Attorney, Agent, or Firm* — Young Basile Hanlon & MacFarlane P.C.

(57) ABSTRACT

A system, apparatus, and method for encoding and decoding a video image having a plurality of frames is disclosed. The method includes identifying in at least one frame a base layer portion primarily composed of low frequency data and an enhancement layer portion primarily composed of high frequency data. The method also includes encoding the base layer portion using a first encoding technique that encodes at a higher quality than a second encoding technique and encoding the enhancement layer portion using the second encoding technique.

22 Claims, 8 Drawing Sheets

(56) References Cited

U.S. PATENT DOCUMENTS

| | | | |
|---|---|---|---|
| 2002/0003575 | A1 | 1/2002 | Marchese |
| 2002/0017565 | A1 | 2/2002 | Ju et al. |
| 2002/0031272 | A1 | 3/2002 | Bagni et al. |
| 2003/0012281 | A1 | 1/2003 | Cho et al. |
| 2003/0053544 | A1 | 3/2003 | Yasunari et al. |
| 2003/0215135 | A1 | 11/2003 | Caron et al. |
| 2003/0229822 | A1 | 12/2003 | Kim et al. |
| 2004/0001634 | A1 | 1/2004 | Mehrotra |
| 2004/0017939 | A1 | 1/2004 | Mehrotra |
| 2004/0196902 | A1* | 10/2004 | Faroudja ............... 375/240.1 |
| 2004/0252886 | A1 | 12/2004 | Pan et al. |
| 2005/0185715 | A1* | 8/2005 | Karczewicz et al. .... 375/240.12 |
| 2005/0238243 | A1 | 10/2005 | Kondo et al. |
| 2005/0259729 | A1* | 11/2005 | Sun ..................... 375/240.1 |
| 2005/0271140 | A1* | 12/2005 | Hanamura et al. ...... 375/240.12 |
| 2006/0039470 | A1 | 2/2006 | Kim et al. |
| 2006/0056689 | A1 | 3/2006 | Wittebrood et al. |
| 2006/0176316 | A1 | 8/2006 | Nagasaki et al. |
| 2006/0245499 | A1 | 11/2006 | Chiu et al. |
| 2007/0036354 | A1 | 2/2007 | Wee et al. |
| 2007/0065026 | A1 | 3/2007 | Lee et al. |
| 2007/0080971 | A1 | 4/2007 | Sung |
| 2007/0121100 | A1* | 5/2007 | Divo ...................... 356/124 |
| 2007/0216777 | A1 | 9/2007 | Quan et al. |
| 2007/0217701 | A1 | 9/2007 | Liu et al. |
| 2007/0223529 | A1 | 9/2007 | Lee et al. |
| 2008/0069440 | A1 | 3/2008 | Forutanpour |
| 2008/0239354 | A1 | 10/2008 | Usui |
| 2008/0260042 | A1 | 10/2008 | Shah et al. |
| 2009/0007159 | A1 | 1/2009 | Rangarajan et al. |
| 2009/0080523 | A1 | 3/2009 | McDowell |
| 2009/0122867 | A1* | 5/2009 | Mauchly et al. ......... 375/240.16 |
| 2009/0161763 | A1* | 6/2009 | Rossignol et al. ....... 375/240.16 |
| 2009/0232401 | A1 | 9/2009 | Yamashita et al. |
| 2009/0237728 | A1 | 9/2009 | Yamamoto |
| 2009/0238277 | A1 | 9/2009 | Meehan |
| 2009/0307428 | A1 | 12/2009 | Schmieder et al. |
| 2010/0021009 | A1 | 1/2010 | Yao |
| 2010/0026608 | A1 | 2/2010 | Adams et al. |
| 2010/0034268 | A1 | 2/2010 | Kusakabe et al. |
| 2010/0104021 | A1 | 4/2010 | Schmit |
| 2010/0235583 | A1 | 9/2010 | Gokaraju et al. |
| 2010/0235820 | A1 | 9/2010 | Khouzam et al. |
| 2011/0002541 | A1 | 1/2011 | Varekamp |
| 2011/0010629 | A1 | 1/2011 | Castro et al. |
| 2011/0026591 | A1 | 2/2011 | Bauza et al. |
| 2011/0033125 | A1 | 2/2011 | Shiraishi |
| 2011/0069890 | A1 | 3/2011 | Besley |
| 2011/0158529 | A1 | 6/2011 | Malik |
| 2011/0219331 | A1 | 9/2011 | DeLuca et al. |
| 2012/0020408 | A1 | 1/2012 | Chen et al. |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving Video". H.264. Advanced video coding for generic audiovisual services. International Telecommunication Union. Version 11. Dated Mar. 1, 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Office Action mailed May 22, 2013 in co-pending U.S. Appl. No. 13/095,975, filed Apr. 28, 2011.

Notice of Allowance in related matter U.S. Appl. No. 13/095,975 mailed Jan. 29, 2014.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Wright, R. Glenn, et al.; "Multimedia—Electronic Technical Manual for ATE", IEEE 1996, 3 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263

(56) References Cited

OTHER PUBLICATIONS

Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp, IEEE Trans Circuits and system for video technology, vol. 9 No. 1, Feb. 1999.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Niolas, H., "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU-Telecommunications Standardization Sector, Study Group 16, Video Coding Experts Group (Question 15), Sixth Meeting: Seoul, South Korea, Nov. 2, 1998, 34 pp.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Office Action Mailed Jun. 5, 2013 in co-pending U.S. Appl. No. 13/095,971, filed Apr. 28, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

VP8 Data Format and Decoding Guide WebM Project. Google On2. Dated: Dec. 1, 2010.

* cited by examiner

METHOD AND APPARATUS FOR ENCODING VIDEO USING DATA FREQUENCY

TECHNICAL FIELD

The present invention relates in general to video encoding and decoding.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. Typically, screen capture and screen casting digital video streams are encoded using video encoding techniques like those used for traditional moving pictures.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use quantization and transform techniques on the frames of a digital video stream to reduce the bitrate (i.e. encoded data size) of the encoded digital video stream. Such techniques are lossy in nature—meaning that part of the original digital video stream is lost during encoding. Quantization techniques are used to discard part of a frame's data based on standard computations, thereby reducing the frame's bitrate. Quantization is a low-pass technique, which can cause blurring or other effects on a frame.

These effects result in video artifacts around the edges in the frame's contents, such as ring artifacts. These artifacts are especially noticeable in digital video streams containing numerous edges, such as in screen capture and screen casting applications.

SUMMARY

A method and apparatus is disclosed for encoding video using data frequency. In one aspect of the disclosed embodiments, a method includes identifying in at least one frame a base layer portion primarily composed of low frequency data and an enhancement layer portion primarily composed of high frequency data. The method also includes encoding the base layer portion using a first encoding technique that encodes at a higher quality than a second encoding technique and encoding the enhancement layer portion using the second encoding technique.

In another aspect of the disclosed embodiments, an apparatus is provided for encoding a video signal including a memory and a processor. The processor is configured to execute instructions stored in the memory to (1) identify in at least one frame a base layer portion primarily composed of low frequency data and an enhancement layer portion primarily composed of high frequency data, (2) encode the base layer portion using a first encoding technique that results in a high quality encoding, and (3) encode the enhancement layer portion using a second encoding technique.

In another aspect of the disclosed embodiments, an apparatus is provided for encoding and decoding a video image having a plurality of frames is disclosed. The apparatus includes means for identifying in at least one frame a base layer portion primarily composed of low frequency data and an enhancement layer portion primarily composed of high frequency data. The apparatus also includes means for encoding the base layer portion using a first encoding technique that results in a high quality encoding and means for encoding the enhancement layer portion using a second encoding technique.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

This Application hereby incorporates by reference in the entirely the following: co-pending U.S. patent application Ser. No. 13/095,975 filed on Apr. 28, 2011 entitled "METHOD AND APPARATUS FOR ENCODING ANCHOR FRAME", co-pending U.S. patent application Ser. No. 13/095,974 filed on Apr. 28, 2011 entitled "METHOD AND APPARATUS FOR ENCODING VIDEO USING MATCHING REGIONS", co-pending U.S. patent application Ser. No. 13/095,971 filed Apr. 28, 2011 entitled "METHOD AND APPARATUS FOR ENCODING VIDEO WITH DYNAMIC QUALITY IMPROVEMENT".

Figure 1:
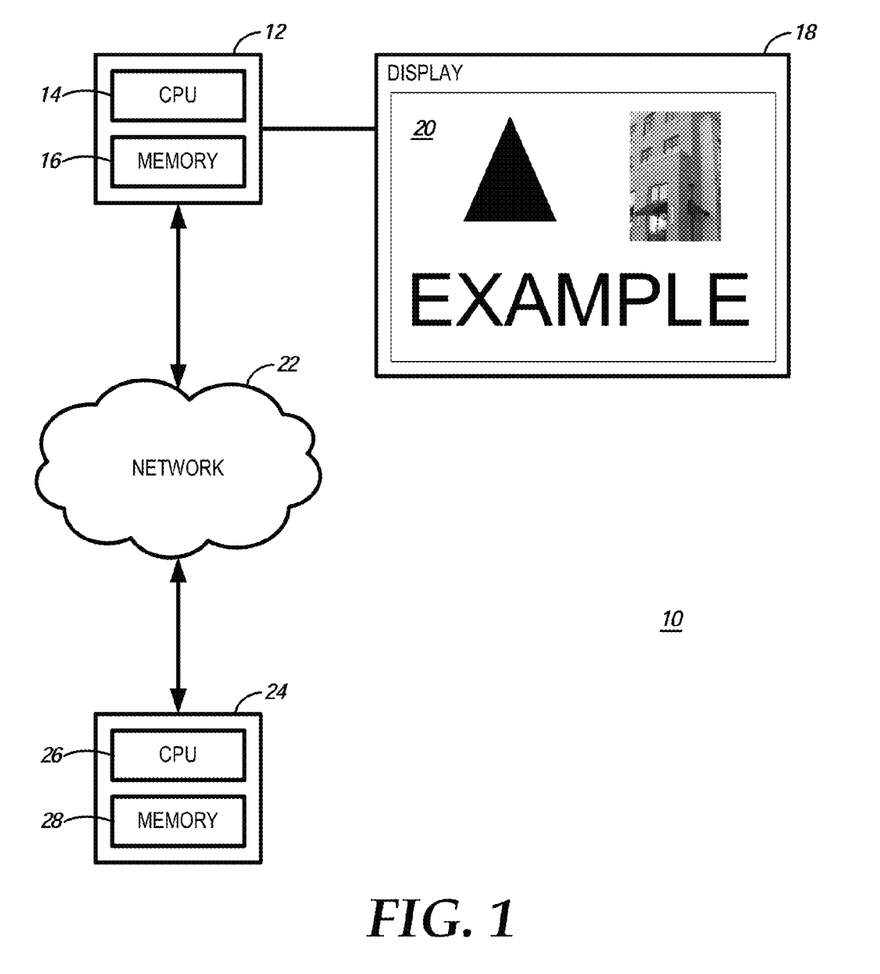
FIG. 1 is a diagram of an encoder and decoder system in accordance with one embodiment.

FIG. 1 is a diagram of an encoder and decoder system 10 for digital video streams. An exemplary transmitting station 12 may be, for example, a computer having an internal configuration of hardware including a central processing unit (CPU) 14 and memory 16. The CPU 14 is a controller for controlling the operations of transmitting station 12. The CPU 14 is connected to memory 16 by, for example, a memory bus. The memory 16 may be random access memory (RAM). The memory 16 stores data and program instructions which are used by the CPU 14. Other suitable implementations of transmitting station 12 are possible such as those explained later.

A display 18 configured to display video output can be connected to transmitting station 12. The display 18 can be implemented in various ways, including by a liquid crystal display (LCD) or a cathode-ray tube (CRT). The display 18 can also be configured for other uses, such as screen casting or screen capture. The display 18 can display, fore example, a frame 20 of a digital video stream.

The frame 20 may include output from the graphical user interface (GUI) of the transmitting station 12. It may include, for example, visual elements such as a taskbar, one or more application windows, and a desktop background. The application windows, for example, may include text, images, or other graphics that may be scrolled within the application windows. However, the frame 20 may include any sequence of video frames containing any type of image, including movies, video clips, or still images.

A network 22 connects the transmitting station 12 and a receiving station 24. The network 22 may, for example, be what is commonly known as the Internet. The network 22 may also be a local area network (LAN), wide area network (WAN), virtual private network (VPN), or any other means of transferring data between transmitting station 12 and receiving station 24.

The exemplary receiving station 24 may be a computer having an internal configuration of hardware include a central processing unit (CPU) 26 and a memory 28. The CPU 26 is a controller for controlling the operations of transmitting station 12. The CPU 26 is connected to memory 28 by, for example, a memory bus. The memory 28 may be random access memory (RAM). The memory 28 stores data and program instructions which are used by the CPU 26. Other suitable implementations of receiving station 24 are possible such as those explained later.

Figure 2:
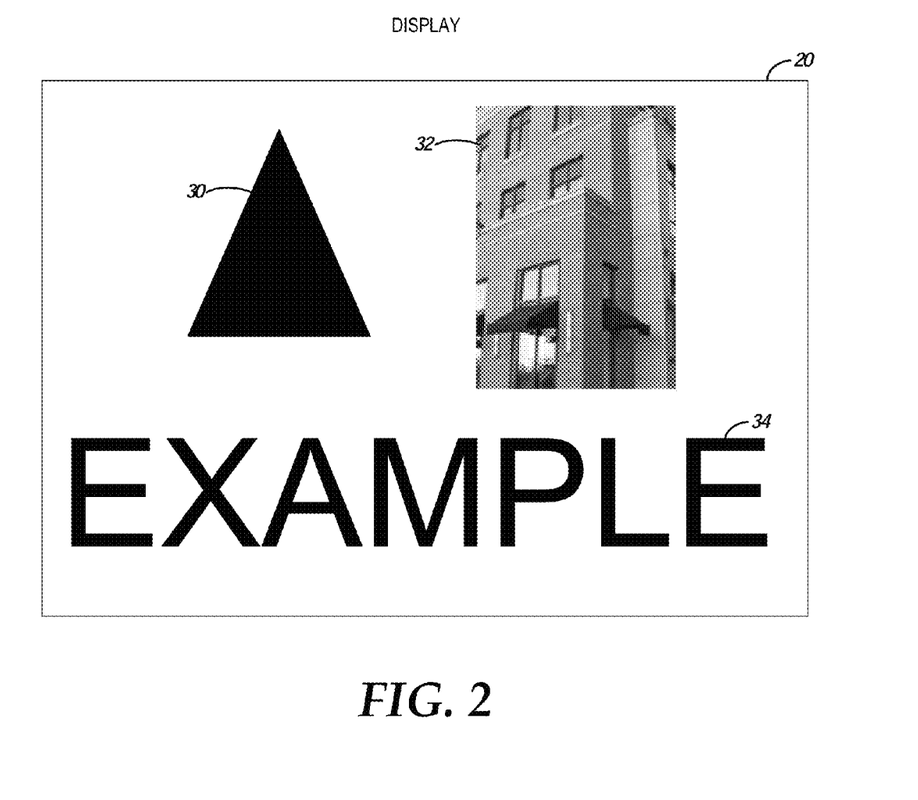
FIG. 2 is an exemplary frame of a digital video stream in the system of FIG. 1.

FIG. 2 is an exemplary frame 20 of the digital video stream as shown in FIG. 1. In the example shown, the frame 20 has geometrical 30, image 32, and text 34 components. Each component has specific characteristics. For example, the geometrical component 30 has pixels that are the same color. Each line of pixels that includes a part of the geometrical component 30 may contain a different number of pixels of the geometrical component 30. For example, the top of geometrical component 30 may only have one pixel in a line of pixels, whereas the bottom of geometrical component 30 may have hundreds of pixels in a line of pixels.

With respect to the image 32, it contains varying colors that together depict a building. With respect to the text 34, the majority of the pixels in each letter of text 34 has the same exact color (black). However, for example, text 34 may be anti-aliased. In such a case, the edges of text 34 will be blurred and the pixels at the edges of text 34 will be various shades of color between the text (black) and the background (white).

The frame 20 and its contents have been chosen purely for explanatory purposes. Practical applications of the methods herein are applicable to digital video streams that may be much more complex than frame 20, and may contain frames that have aspects similar to or different than one or more of the aspects of the frame 20. For example, a frame could include a taskbar and application window(s) that are represented using geometrical shapes, images, text, and combinations or variations thereof.

Figure 3:
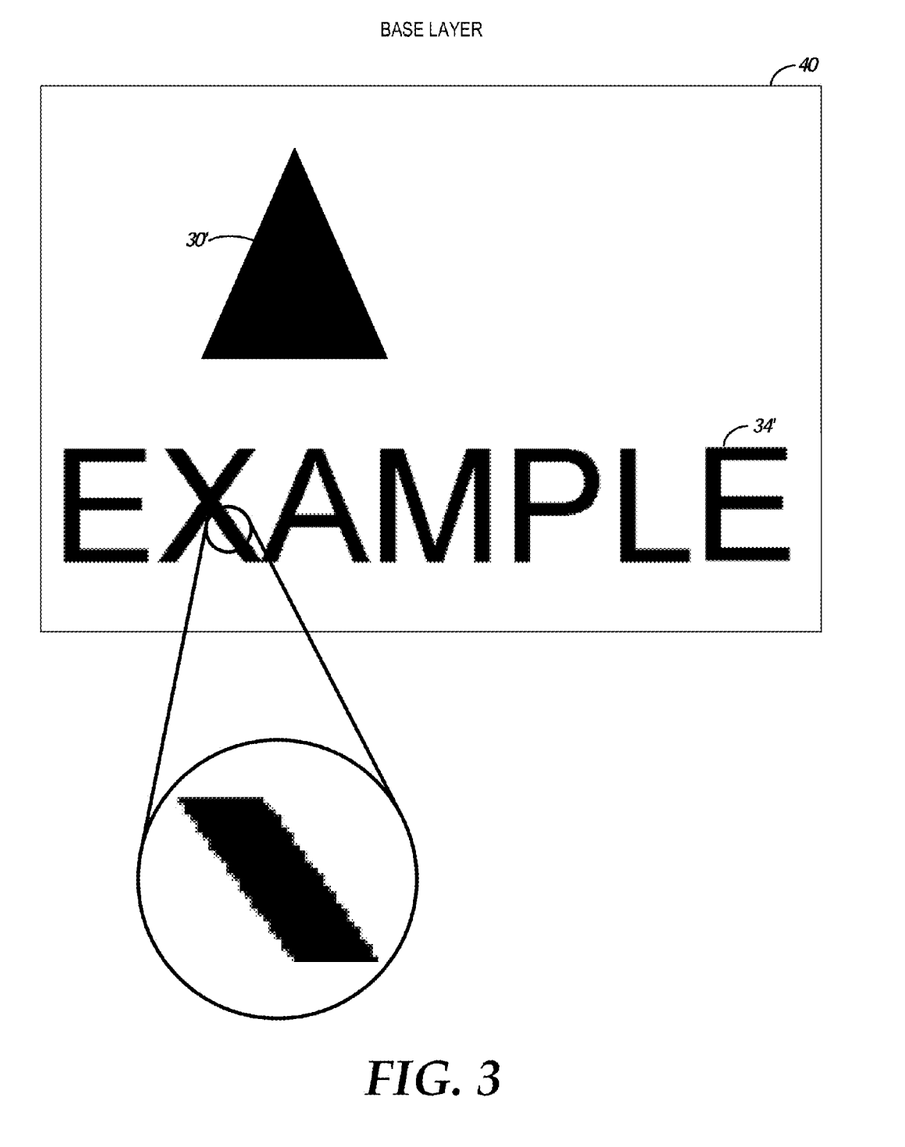
FIG. 3 is the base layer portion of the frame of FIG. 2.
Figure 4:
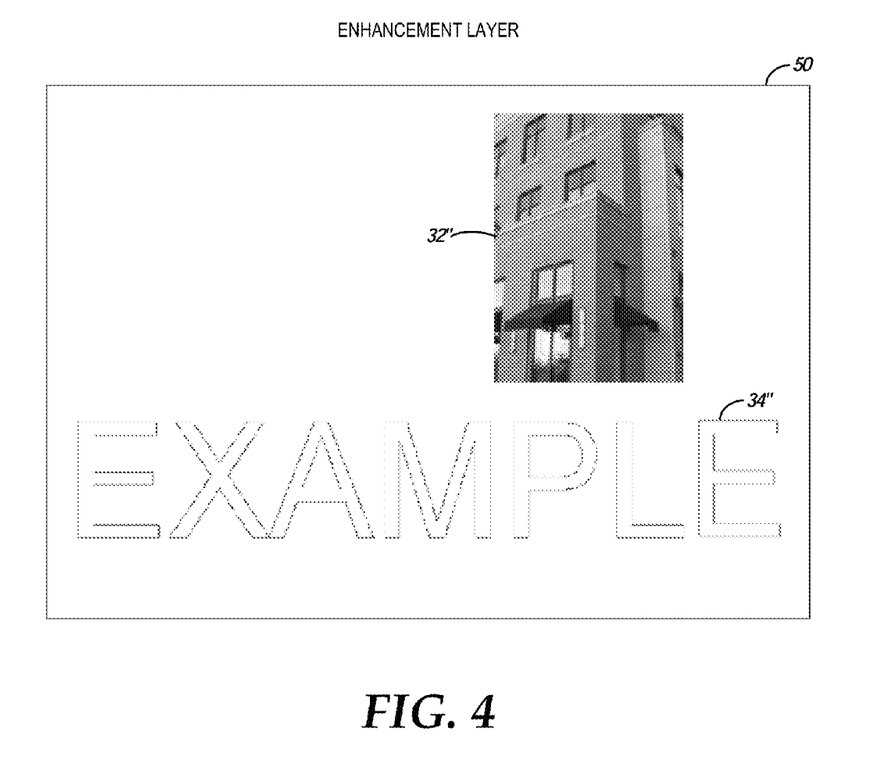
FIG. 4 is the enhancement layer portion of the frame of FIG. 2.

FIG. 3 is the base layer portion 40 of the exemplary frame 20 of FIG. 2 and FIG. 4 is the enhancement layer portion 50 of the exemplary frame 20 of FIG. 2. With respect to both figures, the exemplary frame 20 can be divided into a base layer portion 40 and an enhancement layer portion 50. The layers distinguish between high-frequency and low-frequency portions of the frame. The base layer portion is primarily composed of low frequency data, whereas the enhancement layer portion is primarily composed of high frequency data. In this context, frequency refers to the rate of change of the value of pixels in the frame. For example, with respect to the base layer portion 40, the geometrical component 30', non anti-aliased text 34' and white background could be considered as low frequency portions. Both have a very low rate of change in pixel values and each have substantially identical pixel values.

In other words, the base layer portion is composed of one or more groups of substantially identical contiguous pixels. Substantially identical means that within each group, the difference between the largest pixel value and the smallest pixel value is smaller than a pre-determined threshold. For constant color groups, the threshold can be a value of one. For other groups, the threshold can be pre-determined or chosen by the encoder, either arbitrarily or based on pre-defined criteria.

To contrast, with respect to enhancement layer portion 50, image 32' is an example of a high frequency portion, with variations in pixel values over small areas of the frame. Also, anti-aliased text 34" could be included in the enhancement layer portion 50 because of the variation in pixel values from black to white over a very small area.

A pixel value can be any value associated with a pixel. For example, a pixel value may include a monochromatic value or a color value. A color value may take the form of a RGB color value with separate values representing red, green, and blue. A color value may alternatively take the form of a YUV color value, with separate values representing choma and luma components of the color value.

Dividing the frame into enhancement and base layers allow for application of encoding schemes that are situated for the characteristics of each layer. The base layer will typically include background areas and edges within a frame. Typically, the base layer would encompass GUI elements on a computer screen, such as the taskbar, application windows, or a constant color background. However, other types of video data can be included in the base layer, such as is found in presentation slideshows and line drawings or animated versions thereof.

The base layer can be encoded using a high-quality encoding scheme, which can be, for example, a lossless encoding scheme. Alternatively, the high-quality encoding scheme can be a lossy encoding scheme that does not (after decoding) result in a significant human-perceived data loss. The degree of human-perceived data loss can be measured using many different techniques, including subjective and objective measures. One objective measure that can be used is the peak signal-to-noise ratio (PSNR).

The high-quality encoding scheme can provide a better decoded digital video signal for the base layer by eliminating or greatly reducing the encoding artifacts that can be introduced using other techniques. The high quality encoding scheme can be implemented with high levels of compression with zero or little loss because the base layer is more repetitive in nature.

The enhancement layer can be encoded using standard video or image encoding techniques, including lossy encoding schemes. Such techniques can include a high-quality encoding scheme or a low-quality encoding scheme (i.e. having a greater degree of loss than the high-quality encoding scheme). The low-quality encoding scheme, while resulting in greater data loss, can be less noticeable to the end user when applied to the enhancement layer only, as opposed to being applied to the entire frame (including the base layer). This is because the data in the enhancement layer, being of primarily high frequency data, is more susceptible to standard encoding techniques at higher quantization levels than the data in the base layer. Encoding techniques that can be used include MJPEG, H.264, and VP8 encoding standards. Although any still or video image encoding technique may be used.

Figure 5:
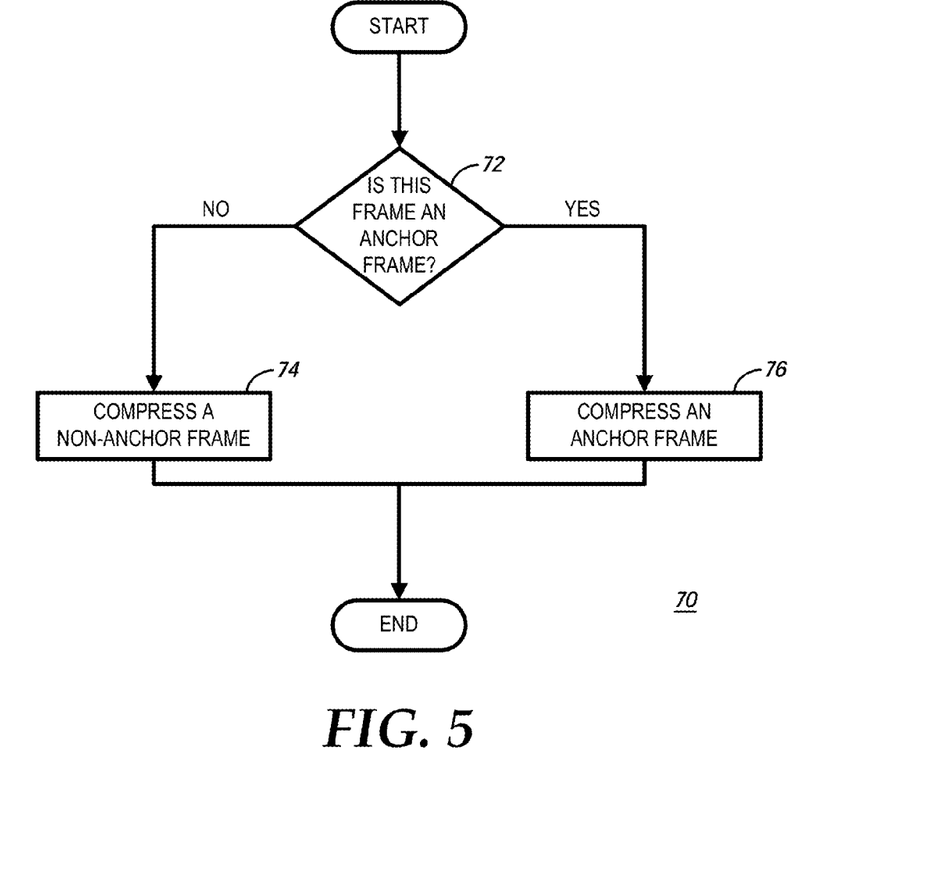
FIG. 5 is a flowchart of a method of encoding a frame using the encoder of FIG.

FIG. 5 is a flowchart of a method 70 of encoding a current frame using the encoder of FIG. 1. The method 70 determines how the current frame of the video data stream should be encoded. The encoder first determines whether the current frame should be an anchor frame or a non-anchor frame (72). An anchor frame is a frame that is encoded with reference to no other frames. In one implementation, the base layer and enhancement layer will cover the entire anchor frame. However, in other implementations, it is possible for other encoding techniques to be used in addition to the base and enhancement layer encoding techniques. A non-anchor frame is a frame that is encoded with reference to a previously encoded frame. In one implementation, the non-anchor frame refers to the frame immediately preceding the current frame.

The encoder can determine that the current frame is an anchor frame using a number of different methodologies. For example, the current frame can be an anchor frame based upon the position of the current frame in the video data stream. If, for example, the current frame is the first frame in the video data stream, the current frame will be an anchor frame. The current frame can also become an anchor frame if it is requested by the receiving station 24. For example, the receiving station 24 might detect an error in a sequence of encoded non-anchor frames. In order to recover from the error, the receiving station 24 can request that the next frame be an anchor frame.

More sophisticated methods of determining whether to use the current frame as an anchor frame can also be used. For example, the current frame may be deemed an anchor frame if the difference between the current frame and the immediately preceding frame is significant (based on a pre-determined threshold or other measure). Or the encoder can strategically determine points in time to insert an anchor frame to prevent error propagation. If it is determined that the current frame is an anchor frame, it is encoded as an anchor frame (76). Otherwise, the current frame is encoded as a non-anchor frame (74).

Figure 6:
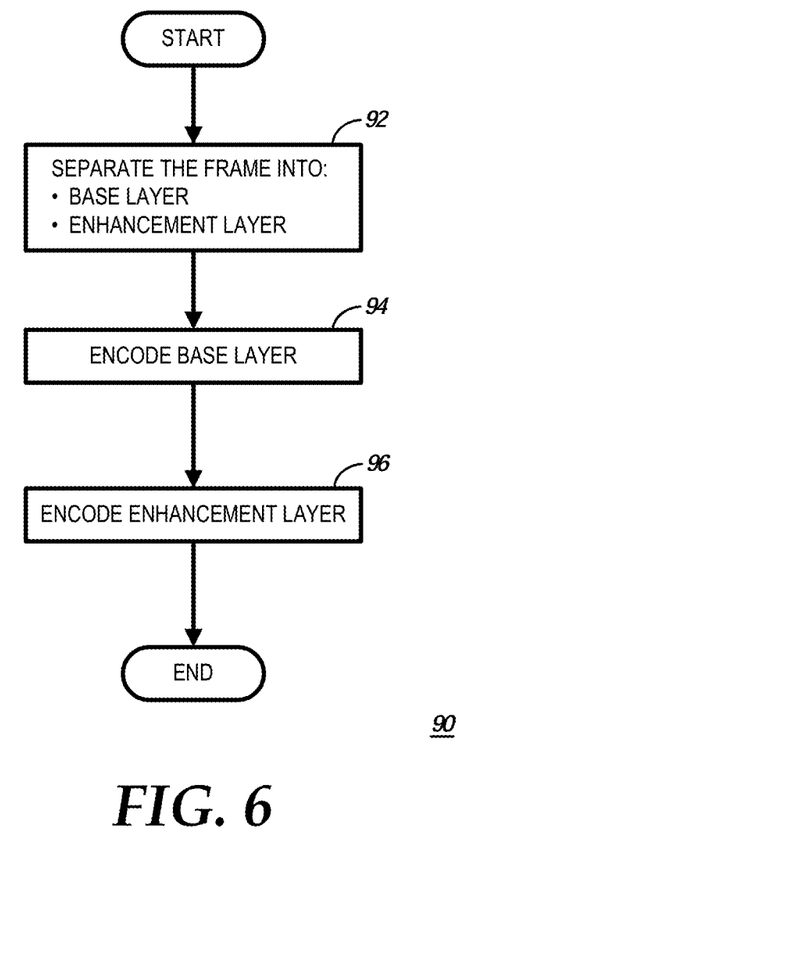
FIG. 6 is a flowchart of a method of encoding an anchor frame using the encoder of FIG. 1.

FIG. 6 is a flowchart of a method 90 of encoding an anchor frame using the encoder of FIG. 1. When encoding the anchor frame, the encoder first separates the frame into a base layer and an enhancement layer (92). In one implementation, the separation is based upon whether or not a group of contiguous substantially identical pixels has a number of pixels exceeding a threshold. Once the frame is divided, the base layer is encoded (94). The base layer can be encoded in one implementation by creating a modified frame. The base layer pixels are copied to the modified frame. The enhancement layer pixels are marked in the modified frame using a special value. Then, the enhancement layer is encoded (96). An exemplary method of encoding the enhancement layer is described in more detail later with respect to FIG. 8.

An exemplary process of identifying the base layer and encoding the base layer is described in a contemporaneously filed US Patent Application entitled "System and Method for Encoding Anchor Frame," assigned to Google, Inc. and incorporated herein by reference.

Figure 7:
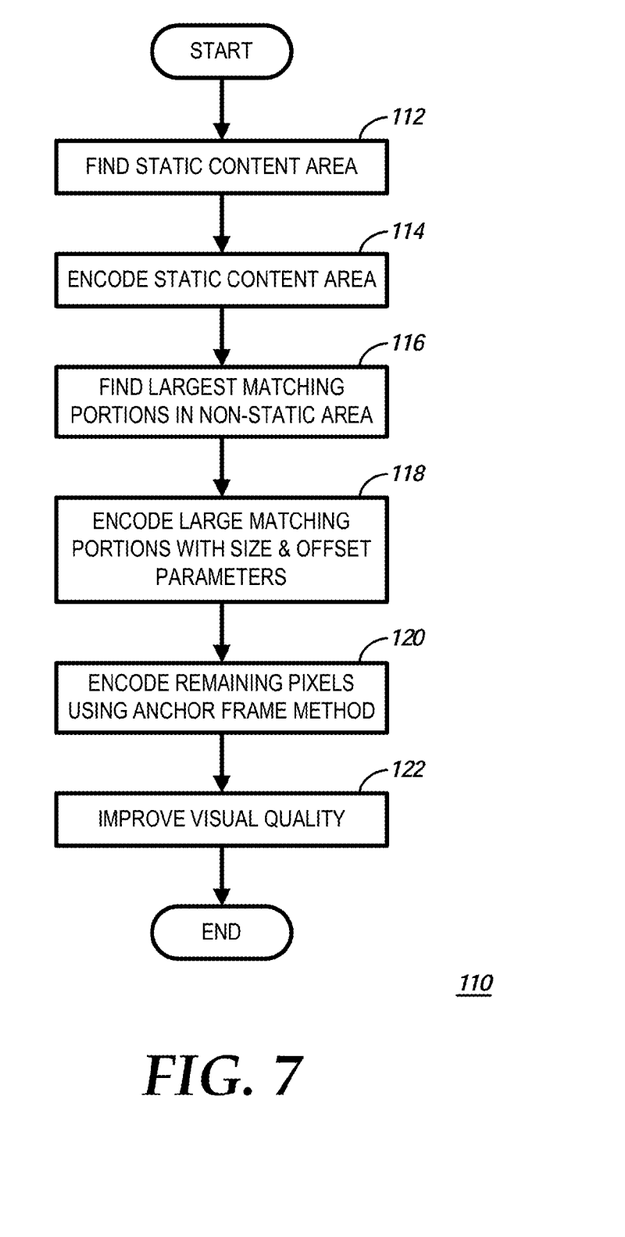
FIG. 7 is a flowchart of a method of encoding a non-anchor frame using the encoder of FIG. 1.

FIG. 7 is a flowchart of a method 110 of encoding a non-anchor frame using the encoder of FIG. 1. In this implementation, the non-anchor frame references the immediately preceding frame. However, in other implementations it is possible that the non-anchor frame could refer to other previously-encoded frames. The encoder first finds the static content area (static content portion) of the non-anchor frame (112). The static content area can be found by way of a simple delta operation between the non-anchor frame and its reference frame. Any pixels that are substantially identical between the two frames will be included in the static content area.

The determination of whether a pixel is substantially identical can vary from implementation to implementation. The basic determination is whether or not the color value of spatially correspondent pixels in the reference frame and the non-anchor frame are exactly the same. However, in some instances, it may be preferable to include pixels in the static content area with substantially similar color value(s), for example, within a threshold. In this instance, the decoded version of the non-anchor frame would reference the color value of the pixel from the reference frame, even though it may be different than the color value of the pixel actually in the non-anchor frame.

In addition, a pixel may be substantially identical even if it is not very similar. An implementation may include a process for despeckling the static content area. For example, the process may determine that a pixel in the non-anchor frame is an error or an aberration in the non-anchor frame and may include that pixel in the static content area even though it is not similar to the spatially correspondent pixel in the reference frame.

Once the static content area is determined, it will be encoded (114). The static content area can be encoded using a bitmask. With this technique, a matrix of bit values is created at the same pixel resolution as the non-anchor frame. For example, each pixel that is in the static content area could be represented with a bit value of 1, whereas pixels not in the static content area could be represented with a bit value of 0. This encoded bitmask can then be used by the decoder to reconstruct the static content area using the reference frame already decoded.

The encoder then will attempt to find matching portion(s) in the non-static area (116). The encoder can perform a one-way or a two-way search between the non-anchor frame and the reference frame to find initial matching portion(s) that are offset between the frames. The initial matching portion(s) can then be expanded to the extent possible to find the matching portion(s). The search for the matching portion(s) contemplates movement between two screens such as the scrolling of an application window. In such a case, the majority of the application window will be exactly the same, just slightly offset from the previous frame. Although the matching portion can be defined by any region of pixels in one frame that has substantially identical pixels in a spatially-offset region of pixels in another frame.

The largest matching portion is contemplated to include both static and non-static pixels. In the example contemplated above, a scrolling application window may contain common background areas and the foreground may even overlap between two frames. In such a case, the common areas of the matching portion would be in the static content area. These common, static pixels may be included in a matching portion so long as the matching portion does not include an excessive number of static pixels (i.e. exceeding a pre-determined threshold).

The number of matching portions searched for can be controlled by the encoder. The search may be based on the number of application windows or other offset portions anticipated or otherwise detected in the non-anchor frame.

Once a matching portion is found, it is encoded using size and offset parameters (118). If the matching portion is rectangular in nature, it is possible for it to be encoded all at once based upon the height and width of the area in pixels and the relative change in position between the reference and non-anchor frame (offset). However, the matching portion can also be encoded on a line-by-line basis in order to allow for varying widths so as to encode the matching portion possible. In this instance, each line would be encoded using the coordinate of the starting pixel of the matching area of the line, the length of the matching area of the line, and the offset between the non-anchor frame and the reference frame.

Any overlap between pixels in a matching portion and the static content area will generally have no adverse effect on decoding since inclusion in each area requires that a pixel be substantially identical to the pixel referenced—thus, any overlapping pixels will be substantially identical. Detailed techniques for searching, defining, and encoding matching portions in a frame are described in a contemporaneously filed US Patent Application entitled "System and Method for Encoding Video Using Matching Portions," assigned to Google, Inc. and incorporated herein by reference.

Any remaining pixels in the non-anchor frame not encoded in the static content area or a matching portion will be encoded using anchor frame encoding techniques (120). As such, the remaining non-anchor frame area will be separated into base and enhancement layer portions and encoded as discussed with respect to the anchor frame above.

Once the non-anchor frame is encoded, the encoder may optionally improve the non-anchor frame's visual quality (122). The visual quality improvement technique allows an encoder to encode an anchor frame, at least in part, using a low-quality encoding scheme and to later improve the quality of at least a portion of at least one subsequent frame using a high-quality encoding scheme. In one instance, the visual quality of part or all of an encoded enhancement layer portion referenced directly or indirectly by the non-anchor frame would be improved. The improvement technique contemplates that bandwidth constraints may require a low-quality encoding scheme on an anchor frame, which typically would have more video data to encode. To the contrary, a non-anchor frame would typically, due to reference-based encoding, have less video data to encode.

In such a situation, the smaller encoded data size (bitrate) of the non-anchor frame could allow for the re-encoding of portions of the non-anchor frame. Portions previously encoded using a low-quality encoding scheme could be replaced within bandwidth constraints using portions encoded using a high-quality encoding scheme. Detailed techniques for improving visual quality are further described in a contemporaneously filed US Patent Application entitled "System and Method for Encoding Video With Dynamic Quality Improvement," assigned to Google, Inc. and incorporated herein by reference.

Figure 8:
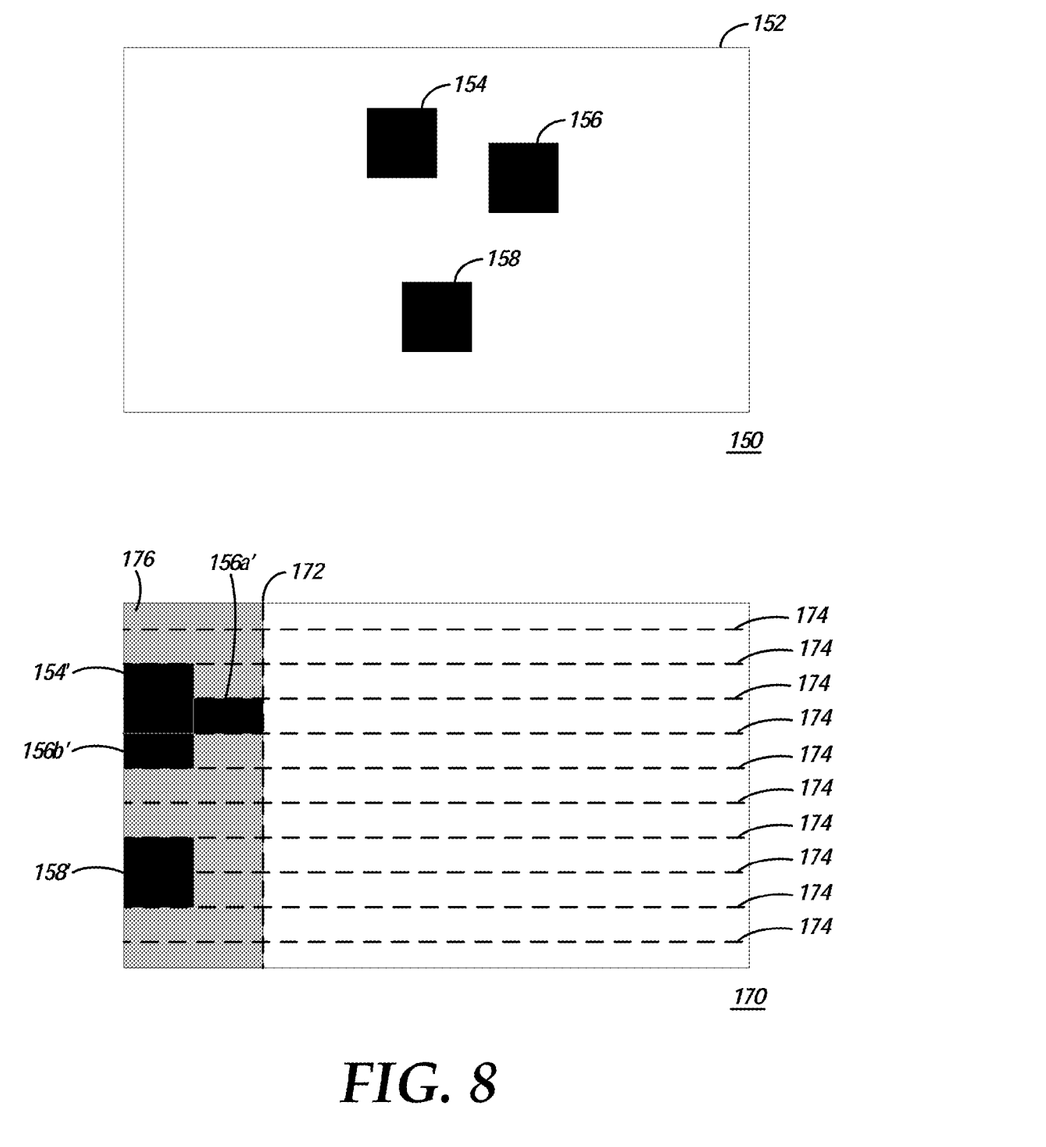
FIG. 8 is a schematic illustrative of a method to encode the enhancement layer.

FIG. 8 is a schematic illustrative of a method to encode the enhancement layer portion. An exemplary frame 150 is shown to illustrate the method. The exemplary frame 150 is separated into a base layer portion 152 (white area) and enhancement layer portions 154, 156, and 158 (black areas). The color and configuration of the layers are shown in such a way to illustrate an exemplary method of encoding an enhancement layer within the encoding and decoding system. As such, actual frames for encoding may be more complex and include enhancement pixels in other configurations, for example, not in contiguous blocks as shown.

When the base layer 152 is encoded, enhancement layer pixels are encoded into the base layer using a special value as a placeholder for the enhancement layer. Such a special value could be a NULL value or any value that is not used to represent a color value within the base layer.

To encode the enhancement layer portion, pixels in the enhancement layer are copied to a temporary frame 170 in a specific manner for encoding. When copied, pixels in each line of the enhancement layer are shifted to the left of each new line in the temporary frame 170. The shift is performed such that all enhancement pixels in a line of pixels in the temporary frame 170 are consecutively adjacent to each other, starting with the left-most pixel in the line of pixels.

For example, enhancement layer portion 154 is shifted to the location shown by enhancement layer portion 154' in temporary frame 170. Enhancement layer portion 156 is also shifted, but not in a contiguous fashion, since some of the lines of pixels in enhancement layer portion 156 has enhancement layer pixels to the left of it. In this example, enhancement portion 156a' is disposed to the right of enhancement layer portion 154' and enhancement portion 156b' is able to be shifted completely to the left side of temporary frame 170. Enhancement layer portion 158 can be shifted completely to the left side of temporary frame 170 to enhancement layer portion 158'.

Once the enhancement layer pixels are copied to temporary frame 170 and shifted, a right boundary 172 is determined. The right boundary marks the area 176 (frame width) to be encoded (shown in gray). The right boundary 172 is determined based on the line length of the line having more enhancement layer pixels than any other line in the temporary frame 170. The area 176 is divided into sections 174 that will individually be encoded by a standard encoding technique. Each section can be a pre-defined height, such as 8 or 16 lines (pixels). Alternatively, the height of each section may be dependent on the area 176 (frame width) as defined by the right boundary 172. As discussed earlier, the standard encoding technique used for each section may include MJPEG, H.264, VP8, or any other still image or video image encoding technique.

The above-described embodiments of encoding or decoding may illustrate some exemplary encoding techniques. However, in general, encoding and decoding as those terms are used in the claims are understood to mean compression, decompression, transformation or any other change to data whatsoever.

Transmitting station 12 and receiving station 24 can be implemented in whole or in part by one or more computers, servers, processors or any other suitable computing device or system that can carry out any of the embodiments described herein. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 24 can, for example, be implemented on computers in a screen casting system. Alternatively, transmitting station 12 can be implemented on a server and receiving station 24 can be implemented on a device separate from the server, such as a hand-held communications device (i.e. a cell phone). In this instance, transmitting station 12 can encode content and transmit an encoded video signal to the communications device. In turn, the communications device can then decode an encoded video signal. Alternatively, the communications device can decode content stored locally on the communications device (i.e. no transmission is necessary). Other suitable transmitting station 12 and receiving station 24 implementation schemes are available. For example, receiving station 24 can be a personal computer rather than a portable communications device.

The embodiments of transmitting station 12 and/or receiving station 24 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 24 do not necessarily have to be implemented in the same manner. Thus, for example, some portions can be implemented in software and others in hardware. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, contain, store, communicate, or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal that includes a plurality of frames, the method comprising:
    identifying in at least one frame a base layer portion primarily composed of low frequency data and an enhancement layer portion primarily composed of high frequency data;
    encoding the base layer portion using a first encoding technique that encodes at a higher quality than a second encoding technique, wherein encoding the base layer portion includes:
        creating a modified frame from the at least one frame by:
            including all pixels in the base layer portion in the modified frame; and
            setting values of pixels in the modified frame that are spatially-correspondent with pixels in the enhancement layer portion to a special value, and
        encoding the modified frame; and
    encoding the enhancement layer portion using the second encoding technique, wherein the at least one frame has lines of pixels and encoding the enhancement layer portion includes:
        creating a temporary frame by using, for each line, the steps of:
            identifying a line in the at least one frame; and
            copying each pixel that is in the enhancement layer portion from the line to a new line in the temporary frame, a left-most pixel in the line's enhancement layer portion being copied to a first position in the new line, and any remaining pixels in the line's enhancement layer portion being copied to sequential positions in the new line, and
        encoding the temporary frame.

2. The method of claim 1, wherein the temporary frame has a frame width, the frame width being equal to a longest line length of all of the lines in the temporary frame.

3. The method of claim 1, wherein encoding the temporary frame comprises:
    separating the temporary frame into sections;
    encoding a output for each section; and
    encoding the temporary frame using the outputs.

4. The method of claim 3, wherein each section includes between 8 and 16 lines.

5. A method for encoding a video signal, the method comprising:
    identifying a frame from a plurality of frames of a video signal, wherein the frame includes a plurality of pixels,
    identifying, by a processor in response to instructions stored on a non-transitory memory, a base portion for the frame, such that the base portion includes a plurality of spatially contiguous substantially identical pixels from the plurality of pixels of the frame, the plurality of spatially contiguous substantially identical pixels having a count of pixels that exceeds a threshold;
    identifying an enhancement portion for the frame, such that the enhancement portion includes a plurality of variant pixels from the plurality of pixels of the frame;
    generating an encoded base portion by encoding the base portion using high-quality encoding;
    generating an encoded enhancement portion by independently encoding the enhancement portion;
    identifying a static portion of the frame including a plurality of static pixels from the plurality of pixels of the frame;
    generating an encoded static portion by encoding the static portion;
    identifying a spatially-offset portion of the frame including a plurality of spatially contiguous pixels from the plurality of pixels of the frame;
    generating an encoded spatially-offset portion by encoding the spatially-offset portion;
    including the encoded base portion, and the encoded enhancement portion, the encoded static portion, and the encoded spatially-offset portion in an output, wherein a combination of the static portion and the spatially-offset portion is disjoint with a combination of the base portion and the enhancement portion; and
    transmitting or storing the output.

6. The method of claim 5, wherein identifying the base portion includes identifying the plurality of spatially contiguous substantially identical pixels, such that a difference between two spatially adjacent pixels from the plurality of spatially contiguous pixels is within an inter-pixel variation threshold.

7. The method of claim 6, wherein a difference between two pixels from the plurality of variant pixels exceeds the inter-pixel variation threshold.

8. The method of claim 5, wherein the plurality of spatially contiguous substantially identical pixels is a first plurality of spatially contiguous substantially identical pixels, and wherein the base portion includes a second plurality of spatially contiguous substantially identical pixels from the plurality of pixels of the frame, the second plurality of spatially contiguous substantially identical pixels having a count of pixels that exceeds the threshold.

9. The method of claim 5, wherein the base portion and the enhancement portion are disjoint.

10. The method of claim 5, wherein the base portion and the enhancement portion are complimentary.

11. The method of claim 5, wherein independently encoding the enhancement portion includes encoding the enhancement portion independently of encoding the base portion.

12. The method of claim 5, wherein independently encoding the enhancement portion includes encoding the enhancement portion using low-quality encoding.

13. The method of claim 5, wherein identifying the static portion includes identifying the plurality of static pixels such that a difference between a pixel from the plurality of static pixels and a spatially corresponding pixel from a reference frame is within an inter-frame variation threshold.

14. The method of claim 5, wherein identifying the spatially-offset portion of the frame includes identifying the plurality of spatially contiguous pixels such that:
   a difference between a first pixel from the plurality of spatially contiguous pixels and a first corresponding pixel from a reference frame is within an inter-frame variation threshold;
   a difference between a second pixel from the plurality of spatially contiguous pixels and a second corresponding pixel from the reference frame is within the inter-frame variation threshold; and
   a spatial difference between the first pixel and the first corresponding pixel is substantially the same as a spatial difference between the second pixel and the second corresponding pixel.

15. The method of claim 5, wherein a combination of the static portion and the spatially-offset portion is complementary with a combination of the base portion and the enhancement portion.

16. The method of claim 5, wherein generating the encoded static portion includes using a bitmask.

17. The method of claim 5, wherein generating the encoded spatially-offset portion includes using at least one of a size parameter or an offset parameter.

18. A method for encoding a video signal, the method comprising:
   identifying a first frame from a plurality of frames of a video signal, wherein the first frame includes a first plurality of pixels;
   encoding the first frame, wherein encoding the first frame includes:
      identifying, by a processor in response to instructions stored on a non-transitory memory, a first base portion for the first frame, such that the first base portion includes a first plurality of spatially contiguous substantially identical pixels from the first plurality of pixels of the first frame, the first plurality of spatially contiguous substantially identical pixels having a count of pixels that exceeds a threshold,
      identifying a first enhancement portion for the first frame, such that the first enhancement portion includes a first plurality of variant pixels from the first plurality of pixels of the first frame,
      generating a first encoded base portion by encoding the first base portion using high-quality encoding,
      generating a first encoded enhancement portion by independently encoding the first enhancement portion, and
      including the first encoded base portion and the first encoded enhancement portion in an output;
   identifying a second frame from a plurality of frames of a video signal, wherein the second frame includes a second plurality of pixels;
   encoding the second frame, wherein encoding the second frame includes:
      identifying a static portion of the second frame including a plurality of static pixels from the second plurality of pixels of the second frame,
   generating an encoded static portion by encoding the static portion,
      identifying a spatially-offset portion of the second frame including a plurality of spatially contiguous pixels from the second plurality of pixels of the second frame,
      generating an encoded spatially-offset portion by encoding the spatially-offset portion,
      identifying a second base portion for the second frame, such that the second base portion includes a second plurality of spatially contiguous substantially identical pixels from the second plurality of pixels of the second frame, the second plurality of spatially contiguous substantially identical pixels having a count of pixels that exceeds the threshold,
      identifying a second enhancement portion for the second frame, such that the second enhancement portion includes a second plurality of variant pixels from the second plurality of pixels of the second frame,
      generating a second encoded base portion by encoding the second base portion using high-quality encoding,
      generating a second encoded enhancement portion by independently encoding the second enhancement portion, and
      including the encoded static portion, the encoded spatially-offset portion, the second encoded base portion, and the second encoded enhancement portion in the output, wherein a combination of the encoded static portion and the encoded spatially-offset portion is disjoint with a combination of the second encoded base portion and the second encoded enhancement portion; and
   transmitting or storing the output.

19. The method of claim 18, wherein identifying the static portion includes identifying the plurality of static pixels such that a difference between a pixel from the plurality of static pixels and a spatially corresponding pixel from the first frame is within an inter-frame variation threshold.

20. The method of claim 18, wherein identifying the spatially-offset portion includes identifying the plurality of spatially contiguous pixels such that:
   a difference between a first pixel from the plurality of spatially contiguous pixels and a first corresponding pixel from the first frame is within an inter-frame variation threshold;
   a difference between a second pixel from the plurality of spatially contiguous pixels and a second corresponding pixel from the first frame is within the inter-frame variation threshold; and
   a spatial difference between the first pixel and the first corresponding pixel is substantially the same as a spatial difference between the second pixel and the second corresponding pixel.

21. The method of claim 18, wherein generating the encoded static portion includes using a bitmask.

22. The method of claim 18, wherein generating the encoded spatially-offset portion includes using at least one of a size parameter or an offset parameter.

* * * * *

UNITED STATES PATENT AND TRADEMARK OFFICE
CERTIFICATE OF CORRECTION

| | | |
|---|---|---|
| PATENT NO. | : 8,804,819 B1 | Page 1 of 1 |
| APPLICATION NO. | : 13/089383 | |
| DATED | : August 12, 2014 | |
| INVENTOR(S) | : Wei Jia | |

It is certified that error appears in the above-identified patent and that said Letters Patent is hereby corrected as shown below:

In the Claims

Column 10, Claim 5, Line 50: "portion, and the encoded" should be "portion, the encoded"

Signed and Sealed this
Sixth Day of January, 2015

Michelle K. Lee
*Deputy Director of the United States Patent and Trademark Office*